Figure 1:
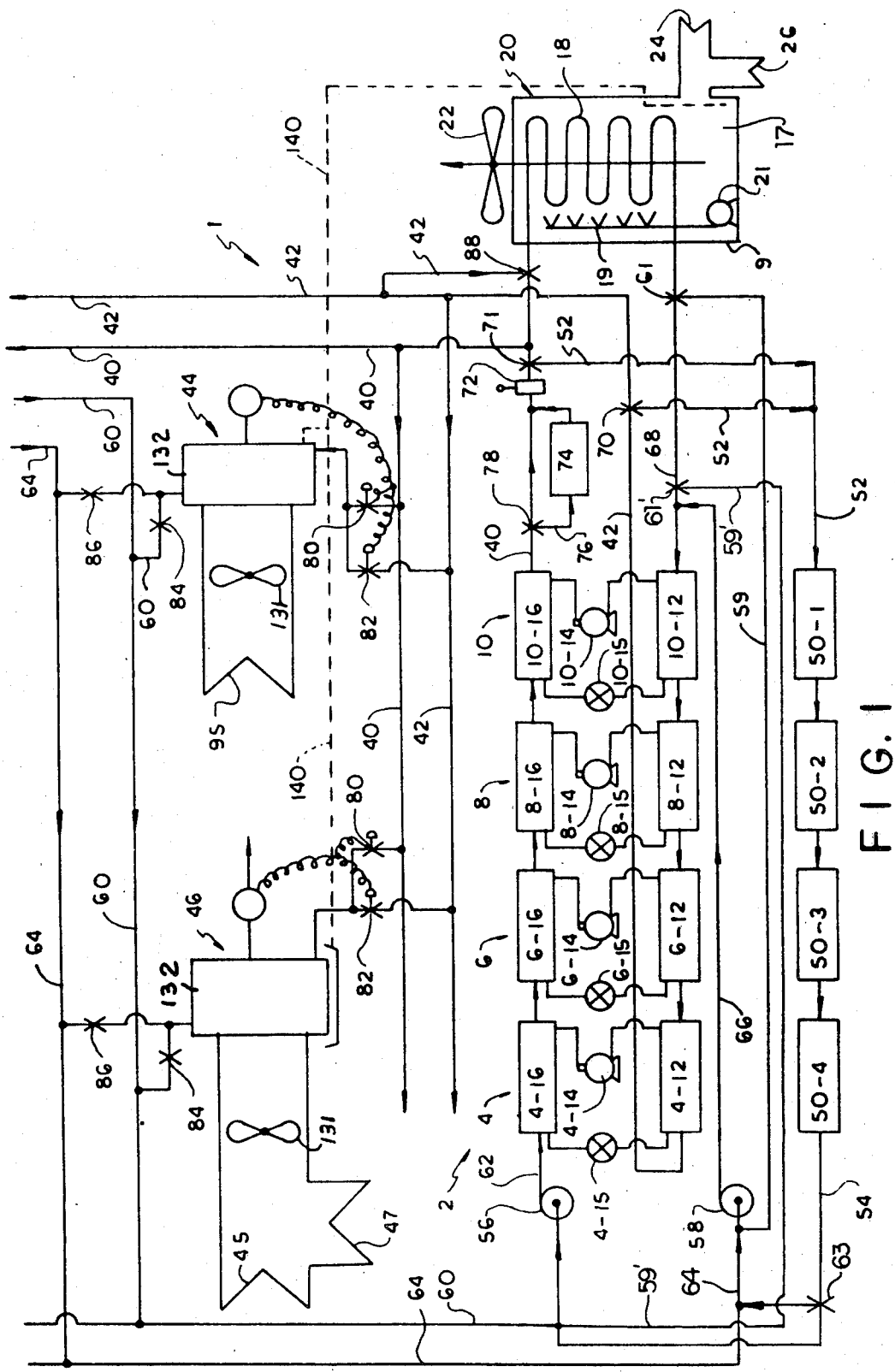

United States Patent [19]

McFarlan

[11] 4,413,478

[45] Nov. 8, 1983

[54] AIR CONDITIONING SYSTEM AND METHOD

[76] Inventor: Alden I. McFarlan, 691 Dorian Rd., Westfield, N.J. 07090

[21] Appl. No.: 340,328

[22] Filed: Jan. 18, 1982

Related U.S. Application Data

[63] Continuation-in-part of Ser. No. 301,655, Sep. 14, 1981.

[51] Int. Cl.³ .............................................. F25D 17/02
[52] U.S. Cl. ......................................... 62/98; 62/118; 62/159; 62/325; 62/99; 165/22
[58] Field of Search ...................... 62/98, 99, 118, 159, 62/325, 412; 165/2, 22

[56] References Cited

U.S. PATENT DOCUMENTS 3,738,899  6/1973  McFarlan ........................ 165/22 X
4,010,624  3/1977  McFarlan ........................ 62/325 X Primary Examiner—Lloyd L. King

[57] ABSTRACT

An air conditioning system and method wherein a central pumping system circulates a heat-exchange liquid (which is water or a glycol solution or other solution called "water") through heating and cooling paths of a refrigeration system and then to and from air-treating units. The fans or blowers of the air-treating units are positioned upstream of the air cooling and heating coils so that the fan heat and pump heat are discharged through the fluid cooler system during cooling load operation, and all of that heat is available for delivery to the air treating units during heating-load operation. The quantity of outside (fresh) air is selected and controlled so that adequate ventilation is provided, and during cold weather so that multi-story buildings may be provided with adequate pressurization to overcome an objectionable inflow of cold air at ground floor levels at entrances and exits. In the embodiments shown, such additional air is discharged through the fluid cooler to carry away heat during cooling load operation. One embodiment includes a separate line for neutral water to each air treating unit. The neutral water is mixed with either the hot or the cold water supplied to each air-treating unit for temperature control as distinguished from the standard three-pipe system wherein hot and cold water are mixed to provide temperature control. Another embodiment is a four pipe system having separate supply and return lines for both hot water and cold water.

15 Claims, 2 Drawing Figures

AIR CONDITIONING SYSTEM AND METHOD

This invention relates to improved air-conditioning systems in which separate streams of water or other heat-exchange liquid are pumped to air-treating units for the various air conditioned spaces, and is a continuation-in-part of my application Ser. No. 301,655, Filed Sept. 14, 1981. Systems of that type are disclosed in U.S. Pat. Nos. 3,850,007 and 4,010,624 which will be discussed below.

The present invention provides for greatly improved efficiencies of air conditioning systems with wider ranges of operation. Systems of the present invention have fluid coolers which provide "heat-sinks" through which the heat removed from the air conditioned space is discharged from the system to ambient air or water. When ambient air is the "heat-sink" fluid for prior air conditioning systems it is common practice to spray water on heat exchange coils to produce evaporative cooling. The present invention utilizes the fluid cooler to perform its "heat-sink" functions in an improved manner, and the fluid cooler also performs additional functions including acting as a source of heat when that is required by the system. Heat is transferred throughout the system and to and from a fluid cooler by a heat-exchange liquid which is called "water", but which may be pure water or a glycol solution or another liquid.

The above-mentioned U.S. Pat. Nos. 3,850,007 and 4,010,624, disclose air conditioning systems having a plurality of fluid coolers, i.e., cooling towers for cooling condenser water or tower condensers. In each of those systems, one tower provides cooling by air without evaporation of water, and another tower which utilizes the condensate from the air conditioning system as the water which is evaporated to provide evaporative cooling. It is considered good practice from an engineering standpoint to provide outside air in air conditioning systems upon the basis of at least 1/10 cubic foot of area per minute for each square foot of air being cooled, and the remainder of the air is recirculated. With a view of conserving energy, it is also considered necessary to maintain the amount of outside air at the lowest level which will provide acceptable conditions within the air conditioned space. That has resulted in maintaining the various operating conditions of air conditioning systems within certain predetermined ranges. The systems disclosed in the above-identified patents operate generally within the accepted ranges of the various conditions, but can operate with more outside air than with the present invention so as to reduce the overall energy consumption. Each of those systems utilizes the condensate from the air conditioning system to cool at least one of the fluid coolers, i.e., a cooling tower or an evaporative condenser as a water cooler. Streams of heat-exchange liquid, such as water, flow through continuous circuits some of which carry the heat from the air-treating units which dehumidify and cool the air, to the evaporator-chillers of the refrigeration units, and another of which carries the heat from the condensers of the refrigeration units to the fluid coolers. A stream of heat-exchange liquid flows through the evaporator-chillers of a series of refrigeration units with its temperature being reduced in steps by the various evaporator-chillers. The flow through the condensers to the respective refrigeration units is counter to the flow through the evaporator-chillers of the respective refrigeration units.

The specific illustrative embodiments of the present invention are systems similar to those disclosed in the above-identified patents. However, in the present embodiments, one fluid cooler is provided, and all of the condensate and the exhaust air available from the system are used to provide evaporative cooling for that fluid cooler. When the system is cooling the air conditioned space, the temperature of the water or other heat-exchange liquid passed to the fluid cooler is at a higher temperature than in the systems of the above-identified patents, and at a much higher temperature than the normally accepted practice. Also, the temperature drop of the heat exchange fluid is much greater than is normally provided in the fluid coolers or cooling towers of such prior air conditioning systems.

The present invention contemplates supplying outside air to the air-treating units in an amount relative to the total amount of air supplied to the air conditioned space which is within the range of 100% outside air to 1/10 cubic foot per minute per square foot of air conditioned space, with recirculated air being added only as the remainder when desirable. It is accepted practice to maintain the air pressure within an air conditioned space at a value slightly above the outside air pressure so that there is leakage from the air conditioned space and air is exhausted automatically from toilets, kitchens, chemical laboratories, etc. Otherwise the amount of exhaust air is the same as the amount of outside air which is added to the system. In accordance with one aspect of the present invention, the amount of exhaust air which passes through the fluid cooler must be sufficient to discharge the amount of heat required to provide proper operation of the system. That is contrary to the generally accepted practice by which it has been considered desirable to use a much lower percentage of outside air than is utilized with the present invention, without penalizing energy consumption caused by greater quantities of outside air.

Figure 2:
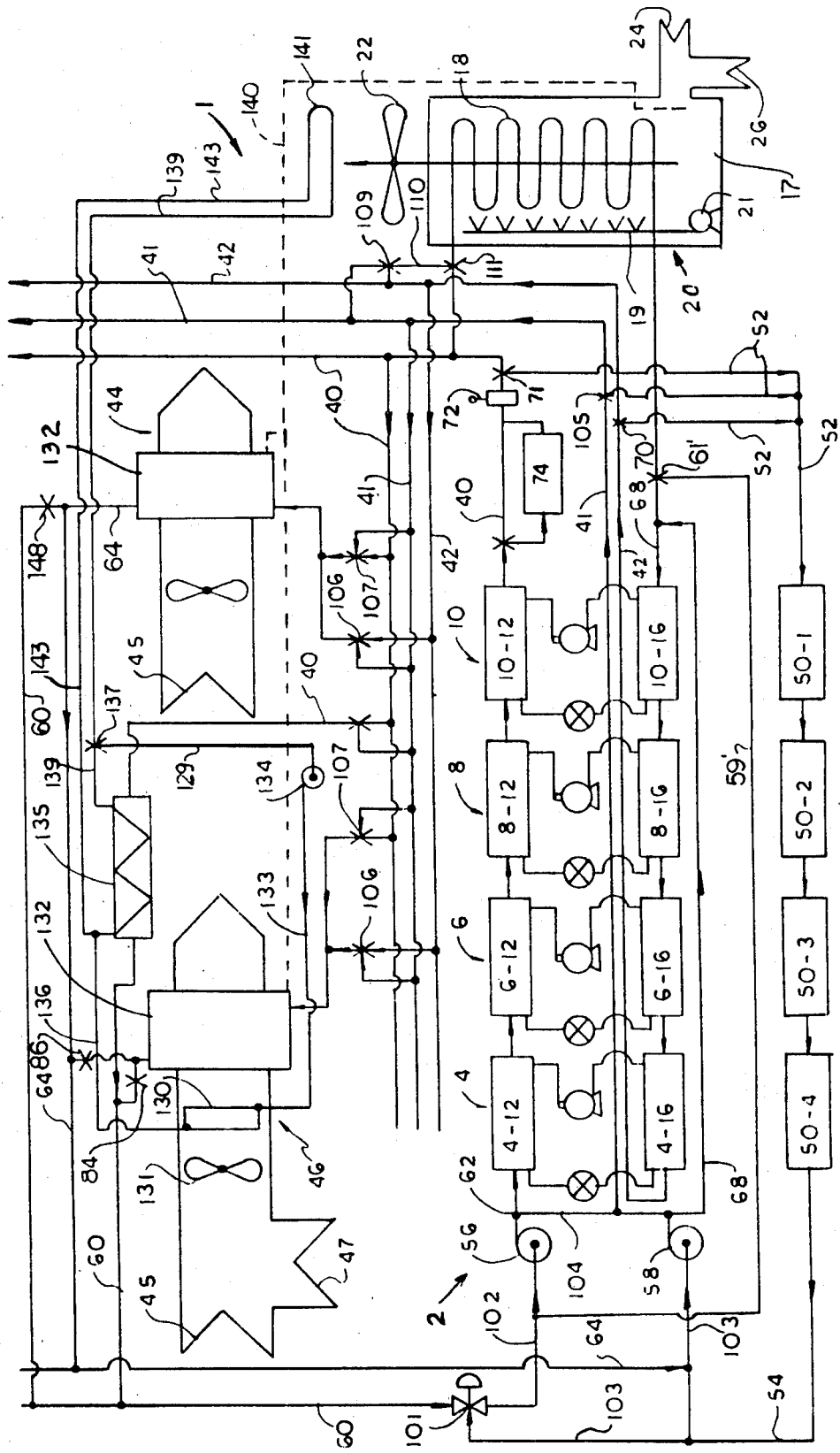

Referring to the drawings:

FIG. 1 is a schematic representation of a four-pipe air conditioning system which comprises one illustrative embodiment of the invention: and, FIG. 2 is similar to FIG. 1 but is of a three-pipe embodiment of the invention.

Referring to FIG. 1 of the drawings, an air-conditioning system 1 has a central refrigeration system 2 with four refrigeration units 4, 6, 8 and 10. Each of the refrigeration units has the following identical components of known types which are identified by the component number with a suffix number corresponding to the number of the refrigeration unit: A water-cooling evaporator-chiller or water cooler 12; a compressor 14; a water-cooled condenser 16; and, an expansion valve 15. There are also other standard control and operating components which are not shown. The water cooling circuits of the evaporator-chillers are connected in series flow to form the staged water-cooling circuit. The water heating circuits of the condensers are connected in series flow to form the staged water-heating circuit.

The system has a single fluid cooler 20 with the following components: A finned air-to-water heat exchange coil 18; a sump pan 17; a sprayer means 19 with a pump 21 which circulates water from sump pan 17 over coil 18; a blower 22 which forces air upwardly through the coil; and, an air supply damper assembly which supplies air to the fluid cooler with air being exhausted from the air conditioned space at 24 and ambient (outside) air being supplied at 26 in the manner more fully explained below.

Air conditioning system 1 has an air treating unit 44 which is one of a number of similarly functioning units which supply conditioned air to the periphery of the building, and an air treating unit 46 which is one of a number of similarly functioning units which supply air to the interior of the building. Hot and cold water is supplied to the air treating units, respectively through separate hot water supply line 40 and its branches and cold water supply line 42 and its branches, and each unit is connected to separate hot water and cold water return lines 60 and 64, respectively. Each of air treating units 45 is supplied with a stream of return air at 46 and a predetermined percentage of outside air at 47. Each of the air treating units has a "single pass" coil (not shown) in which the water flows from right to left in a continuous path in counter-flow relationship to the left to right flow of the stream of air which is being heated or cooled. That provides maximum heat transfer between the streams of air and water so that the air leaves the unit at a temperature which is near that of the entering water. The system has a storage tank circuit with four water retention or storage tanks 50 connected (and numbered 1 to 4) in series flow relationship between a supply line 52 and a discharge line 54. Line 52 is connected through normally closed valves 70 and 71, respectively to cold water line 42 and hot water line 40 so that either hot water or cold water can be supplied to the tanks.

Two pumps 56 and 58 constitute the water-pumping means which circulates the water throughout the entire air conditioning system. Pumps 56 and 58 receive water respectively through a hot water return line 60 and a cold water return line 64, and the branches of each of which extend from each of the air treating units 44 and 46. Pump 56 can also receive water from tanks 50 through a line 54 having a valve 63 therein, and from line 68 through a valve 61' and a line 59'. Pump 58 can also receive water through a line 59 which is connected by a diverting valve 61 in the discharge line 68 from coil 18 of the fluid cooler. Pump 58 can also receive water from the series flow circuit of tanks 50 through line 54. Pump 56 discharges water through a line 62 which leads only to the staged water-heating circuit of the condensers in series thence to the hot water line 40. Pump 58 discharges water through a line 66 and line 68 to water-cooling circuit of the evaporator-chillers in series and to the cold water line 42. It should be noted that the flow through the condensers is counter to the flow through the evaporator-chillers of the respective refrigeration units. That provides substantial advantages from the combination of the staged cooling by the water-cooling circuit and the counterflow staged heating by the water-heating circuit.

Valves 70 and 71 may be opened to connect the cold water line 42 or the hot water line 40 to line 52 so as to permit either cold or hot water to be delivered to the series flow circuit of tanks 50. Line 54 is also connected through a normally closed valve 63 to line 60 so that water from tanks 50 can be delivered to pump 56. Valves 70, 71 and 63 provide great flexibility in operating, for example, to permit the off-peak recirculation of water from and back to tanks 50 to deliver heat to or extract heat from the water in the tanks during off-peak cooling-load heating-load conditions at night and thereby provide a "flywheel" effect to assist in handling an excessive heating or cooling loads during the daytime. A boiler 74 is connected in a line 76 which extends parallel to line 40, and diverting valve 78 is operative to pass water through the boiler when auxiliary heat is required. A heat-balance controller 72 senses the temperature of the water in line 42 downstream of the boiler circuit and restricts the flow through the condenser to increase the water temperature, and when desirable operates valve 78. However, the facility for recirculating water from the tanks through the water-cooling and water-heating circuits and back to the tanks is of substantial benefit under extreme heating and cooling load conditions because it is possible to remove heat from or deliver heat to the water in the tanks and thereby increase the heating cooling capacity of the system. That and other features of the system reduce the need to use the boiler. Heat balance controller 72 also senses the temperatures outside and within the system, and exerts overall control over the entire air conditioning system and responds to the temperatures and heating and cooling load conditions throughout the air conditioned space. Except as specified and discussed below, the control circuit, including the sensing and control components and the modes of operation, are in accordance with the prior U.S. Pat. No. 3,738,899.

Each of air treating units 44 and 46 is connected to hot and cold water supply lines 40 and 42 respectively by valves 80 and 82 which are thermostatically controlled in response to the temperature of the air discharged by the unit. Each of units 44 and 46 is thereby connected to receive either hot or cold water, but not a mixture of the two, to maintain the desired air temperature in the conditioned spaces. Valves 84 and 86 connect each of units 44 and 46 to the hot and cold water return lines 60 and 64, respectively. Valves 80 and 84 for each unit 44 and 46 are opened and closed together, and valves 82 and 86 are opened and closed together, so that the hot water from line 40 is returned to pump 56 and the cold water from line 42 is returned to pump 58. A modulating valve 88 connects both the hot water line 40 and the cold water line 42 to coil 18 of the fluid cooler. Modulating valve 88 is normally in the position in which it supplies only hot water to coil 18 of the fluid cooler. However, there are times when valve 88 supplies cold water to coil 18, for example, when the fluid cooler is being used as a source of heat with a heat pump action extracting heat from the exhaust air. The outside air dampers can then be closed so that only exhaust air passes through the fluid cooler, and cold water is supplied to coil 18. Valve 61 is then positioned to pass the water from coil 18 through line 59 to pump 58 and through the water-cooling circuit. Water returning through line 64 also passes from pump 58 through the evaporator-chiller circuit. As explained above, the chilled water may be passed to the tank circuit and the water in the tank is spaced to pump 56 and through the water-heating circuit. Those operations raise the temperature level of the hot water so that the heat extracted from the air in the fluid cooler and the internally-produced heat which is recovered through units 46 and stored in hot water in tanks 50 is utilized to handle the heating load.

While pumps 56 and 58 are not connected to operate at all times in parallel, the flow circuits are interconnected so that the water flows along many different paths. The system of FIG. 1 operates completely under the automatic control of heat balance controller 72 which operates the valves and other components in response to changes in the heating and cooling load conditions of the various air conditioned spaces and the ambient air temperature, and in accordance with a daily time program.

Condensate from coils 132 of the air treating units is delivered to the fluid cooler and is used for evaporative cooling of coil 18. A gravity-feed system for that purpose is represented by the dotted lines 140.

The following are illustrative modes of operation of the system of FIG. 1:

1. Various embodiments of the present invention incorporate certain concepts of U.S. Pat. No. 3,738,899 and involving the utilization of water storage tanks. The water acts as (a) a heat source under high heat load conditions, and (b) as a source of supplementary stored chilled water under high cooling-load conditions. The tanks contribute substantially to the high efficiency of the illustrative systems from the standpoint of conservation of energy. The tanks also broaden the scopes of the heating and cooling loads which the illustrative system can handle.

2. For peak cooling load conditions without use of the tanks, the return water from line 64 is added to the cooled water from the fluid cooler in line 68, and the hot water from the condenser circuit flows to the fluid cooler.

3. For Summer night operation, particularly when high cooling load conditions are anticipated on the following day, the water in tanks 50 is cooled by recirculating it through the evaporator chillers and through line 52 to the tanks and hot water passes from line 40 through the fluid cooler, line 68, valve 61 and line 59 to pump 58. During night operation the condenser heat is dissipated through the fluid cooler using outside air. The stored chilled water then aids in handling the cooling load during the following day.

4. For peak heating load conditions with or without the use of the tanks, the chilled water flows from line 42 through valve 88 to the fluid cooler in which the water is heated by the exhaust air and it returns through line 68 to the evaporator circuit, or to the evaporator circuit through the tanks. The chilled water which has been heated in coil 18 and then returned is cooled again in the evaporator-chiller circuit, or passed through the tank circuit where it is stored in the tanks circuit so as to add heat to the system, and the heat is delivered to the water in the condenser circuit which flows through line 40 to the air treating units, as the return water passes to the condenser circuit or to the water-heating circuit.

Also, when tanks 50 contain hot water, and particularly systems using 100% outside air or at peak heating loads, some chilled water is passed through line 42 and valve 88 to coil 18 of the fluid cooler and then through valve 61 and line 59 to pump 58 and through the evaporator-chillers. The return chilled water is recirculated through tanks 50 and displaces warmer water from the tanks. The warm water from the fluid cooler and from the tanks false loads the evaporator-chillers and delivers the additional heat to the hot water which flows through the water-heating circuit.

5. For heating below the break-even temperature (which is the outside air temperature at which the overall heat loss from the system is equal to the heat produced within the system), heat is extracted from the exhaust air by the fluid cooler. For that operation, chilled water flows from line 42 through valve 88 to the fluid cooler and thence through line 68, valve 61 and line 59 back to pump 58 and through the evaporator-chillers.

6. During a Winter building "shut down" period, hot water in tanks 50 can be used as a heat source by recirculating water from the tanks through the water-cooling circuit to "false load" the condensers.

The system of FIG. 2 differs from that of FIG. 1, only as pointed out and as is obvious from the construction disclosed. There is a third liquid distribution line 41 for neutral water which is at a temperature between those of the hot water and the cold water.

Line 41 extends to the valves supplying water to the various air treating units and is connected elsewhere as shown in the drawing. The components of the system of FIG. 2 which are identical with those of FIG. 1 are given the same reference numbers. When desirable, return line 60 is connected through a valve 148 to line 64 and through a valve 101 and a line 102 to pump 56, and from valve 101 through a line 103 to pump 58. Hence, the return water from any of units 44 and 46 can be delivered to either of the pumps. A common discharge line 104 is connected to the outlet sides of both of the pumps, and neutral line 41 extends from line 104 so that line 41 can receive water from either of the pumps. Line 103 is also connected to the discharge line 54 from the storage tank circuit, and neutral line 41 is connected through a valve 105 to supply line 52 to the tank circuit, so that the tank circuit can receive hot water or cold water or neutral water, but discharges only through pump 58. However, water from either pump can be discharged through the evaporator-chiller to line 42, or to neutral line 41, or through the condenser circuit to hot water line 40. However, the "preferential flow pattern" is from pump 58 through the chiller circuit to line 42, and from pump 56 through the condenser circuit to line 40, and secondly only from each pump to neutral line 41. The flow patterns from the pumps result directly from the flow through the various air treating units 44 and 46. That is, when greater amounts of either hot or cold water are used, there is a drop in the back pressure in the respective line 40 or 42, and less water flows from the respective pump to another path. At each of the air treating units there are two variable mixing valves, valve 106 which is operative to supply controlled amounts of cold water and neutral water to the unit, and valve 107 which is operative to supply controlled amounts of hot water and neutral water to the unit. Hence, each unit is supplied with either hot water or cold water alone or a mixture of one of those with the neutral water, to thereby control the temperature of the air being discharged from the unit.

A modulating valve 109 connects neutral water line 41 and cold water line 42 to a line 110 which is connected through a modulating valve 111 to coil 18 of the fluid cooler, so that either cold water or neutral water or a mixture of the two can be supplied to coil 18. Valve 111 is also connected to hot water line 40 so that hot water or a mixture of hot water and neutral water from line 110 can be supplied to coil 18. However, the invention does not contemplate mixing hot and cold water at valve 111, and neutral water is supplied to line 110 if any water is mixed with the hot water by valve 111.

The system of FIG. 2 is also provided with an air-preheater system for air-treating units 46. A glycol solution or other anti-freeze liquid is supplied to a heat-exchange coil 130 which is positioned between fan 131 and a heat-exchange coil 132 so as to pre-heat the air flowing into coil 132. A glycol solution is heated in a heat-exchanger 135 and is supplied to coil 130 from the heat-exchanger through a line 129, a pump 134 and a line 133. A line 136 from coil 130 to the heat-exchanger provides for the return flow. Heat-exchanger 135 receives hot water from line 40 which is discharged to line 60 after passing in heat-exchange relationship with the stream of glycol solution.

An additional means for heating the glycol solution is provided by a coil 141 in the fluid cooler positioned in the path of the exhaust air. The exhaust air will have given up a substantial amount of heat in passing through coil 18, but normally will be at a temperature substantially above that of the outside air being supplied to units 46. A pair of lines 143 and 139 extend from coil 141 respectively to line 136 and to a valve 137 in line 129. Valve 137 is operative to divert all or part of the stream of the glycol solution flowing to pump 134 from line 136 and heat-exchanger 135 to line 139 so that the glycol solution is heated in coil 141 is delivered to pump 134 and flows through line 133 to coil 130. When sub-freezing temperature air is being supplied to units 46, the glycol solution will be at a sufficiently high temperature to pre-heat the air entering unit 46.

The following are illustrative modes of operation of the system of FIG. 2:

1. At peak cooling during the daytime with 20% outside air, for example, and without use of the water in the storage tanks, the chiller water temperature is reduced from 72° F. to 40° F., and the temperature of the hot water is increased from 77° F. to 115° F. The water flowing through the fluid cooler is cooled from 115° F. to 72° F. The outside air enters at 95° F., and air is delivered to the air-conditioned spaces at 55° F., and returns to units 46 at 78° F.

2. At peak cooling loads during the daytime and with 100% outside air, and with the water in tanks 50 having been pre-cooled during the night, all of the hot water passes to the fluid cooler and flows with some water from tanks 50 to the evaporator-chiller circuit. The amount of water from the tanks is that required to satisfy pump 58 (when added to the water from the fluid cooler), and the same amount flows from neutral line 40 to the tanks. Illustratively, chilled water flows from tanks 50 at 40° and flows through neutral line 41 to units 44 and 46.

3. At peak heating loads, the water in tanks 50 may be used to supply supplemental heat, and heat can be recovered by cooling the exhaust air. For that operation, pump 58 receives water from tanks 50 and the air treating units through line 60 and 64, and the chilled water flows to the fluid cooler which is supplied with exhaust air only. Pump 56 directs water through the condenser circuit. The neutral water can flow from either of the pumps.

4. When one or more of the air treating units requires heating while other air treating units require cooling, neutral water is supplied to the units requiring heating as long as the neutral water will supply the desired heating.

In each of FIGS. 1 and 2, the entire water circulating system is interconnected to the extent necessary to provide continuous flow from the two pumps. In FIG. 2, the flow is through the hot, cold and neutral water lines to the various air treating units, whereas, in FIG. 1, there are various hot water and cold water circuits which are separate. The paths of flow are created by controller 72 which controls the temperature of the hot water and the quantity and temperature of the water flowing to the fluid cooler, and to deliver heat to or carry heat from the air treating units, and to carry heat to and recover heat from the fluid cooler and the tank circuit. With a cooling load, with the water passing through coils 132 counterflow to the air, the air picks up the fan heat and transfers it to the water leaving the coil without materially reducing the air-cooling effect of the coils. The water passes to pump 56 and also picks up the pump heat, and flows to the condenser circuit, so that all of the fan and pump heat is carried to fluid cooler 20. With a heating load the fan heat gives an air-preheating effect, and the pump heat is added to the hot water. Hence, the fan and pump heat is carried to the fluid cooler at outside temperatures above the break-even temperature, and to the air treating units at outside air temperatures below the break-even temperature. The illustrative systems include a "fluid cooler", which is an evaporative cooling tower, but it is also a heat source. However, it may be a water heat-exchanger wherein the well-water or water from another source is a heat-sink and heat source.

In the illustrative embodiments, the fluid cooler utilizes the condensate and the exhaust air to provide the heat-sink means, and utilizes the exhaust air as a heat source during operation below the break-even temperature. It is understood that a stream of water from a well or another source can be the heat-sink and a heat source, with a liquid-to-liquid heat-exchanger being the "fluid cooler". With either type of fluid cooler, the fluid, either air or well-water, being discharged from the system is a potential heat source below the break-even temperature, and is a potential heat-sink above the break-even temperature.

This invention contemplates the necessary use of a minimum amount of outside air with substantially the same amount being exhausted through the fluid cooler and thereby raising the wet bulb temperature of the exhaust air to a level higher than is the usual practice. That is made possible by the higher temperature condensing water leaving the staged condenser circuit before entering the fluid cooler, thus allowing the available quantity of exhaust air to pick up much more heat than in the systems of the previous patents mentioned above.

Where the system requires more outside air than required for normal human-comfort applications, such as hospitals, laboratories, restaurants, etc., advantage can be taken of the greater resulting amount of exhaust air to thereby reduce the number of stages in the staged water cooler system. That is because the greater quantity of exhaust air available will permit the dissipation of the generated condenser heat with a lower wet bulb temperature leaving the fluid cooler.

The minimum quantity of dehumidified outside air to satisfy the exhaust air requirement for the fluid cooler will be about 0.11 cubic foot per minute per square foot of air conditioned space. However, the use of greater quantities of outside air, when available, and even when not necessary for adequate ventilation requirements, can sometimes be justified to reduce the overall consumption of compressor energy. That is true particularly when greater quantities of outside air are provided at outside wet bulb temperatures below peak design conditions.

In many cases the condensate may be more than enough to supply the make up water for the fluid cooler especially when 0.2 cubic feet per minute of outside air per square foot of conditioned space is introduced through air treating units 46. When additional water is required to maintain a satisfactory level in the fluid cooler pan, an automatic inlet valve controlled by a float in the pan will admit additional water.

A drain valve in the pan set at a higher level in the pan will permit water to overflow when excess water is supplied. By increasing those two levels, excess condensate water can be accumulated to handle the evaporative cooling when the water in storage tanks 50 is being cooled and there is no air cooling so that no condensate is being generated.

In FIGS. 1 and 2, the condensate flows by gravity to the fluid cooler. When the fluid cooler is at a level above that of the air treating units, the condensate is collected in a sump tank, and is pumped to the fluid cooler, with there being a float control to start the pump at a maximum condensate level in the sump tank and to stop it at a minimum level.

The systems of FIGS. 1 and 2 have fresh water supply means (not shown) which are operative to add water to the fluid cooler when the water level in the sump is below an acceptable level. However, it is contemplated that the condensate will be sufficient in many installations to make it unnecessary to add additional water except under emergency conditions. A drain valve (not shown) in the sump permits condensate to overflow when the amount of condensate is greater than that evaporated in the fluid cooler.

While removing condenser heat, the water leaving the fluid cooler approaches the wet-bulb temperature of the entering air. A practical design is to provide a difference between those temperatures of the order of ten degrees F. so that 62° room air-exhaust temperature will produce 72° return water leaving the fluid cooler. For example, at peak cooling load conditions of 95° outside temperature, the return water from the air-treating units, after picking up the fan heat from the fan located ahead of the unit coils as shown in FIG. 1, will be between 74° and 84° depending upon the percentage of outside air used. The fan heat will raise the return water temperature from two to four degrees F. Normally, the refrigeration load required would be in relation to the temperature of the water entering the first water cooler (evaporator-chiller) minus the temperature of the water leaving the last water cooler, for example 74° to 84° entering (depending upon the percent of outside air) and the leaving temperature, for example, 40°. By comparison, with the water leaving the fluid cooler at 72°, the refrigeration load is reduced in the ratio of the order of $(72-40)/(74-40)$ to $(72-40)/(84-40)$ depending upon the percent of outside air used.

In effect, this invention permits the use of the heat pump principle to raise the temperature of the hot water from the condenser circuit by staging the flow of the water through the evaporator-chillers counter to the flow through the condensers of the respective refrigeration units. It is noted this higher condensing water temperature is obtained without increasing the compressor horsepower as would be the case for equal condensing water temperatures using single stage compressor systems.

It is also noted that greater quantities of outside air are possible without the penalty of higher operating expense as would be in the case with present conventional systems. This is particularly important in multistory office buildings because of stock effect. For example, with low volume of outside air such as 0.1 cubic foot of air per minute per square foot of air conditioned space, the stack effect can cause infiltration of outside air through doors particularly at the lower level floors at low outside air temperatures. Severe heating problems have occurred at low outside air temperatures and the higher hot water temperatures made possible by the present invention overcome those problems.

The provision of a neutral water line in the system of FIG. 2 gives very substantial advantages over the now convention "three pipe" systems of U.S. Pat. No. 2,796,740 where hot and cold water lines and a return line extend to each air treating unit. With those systems, hot and cold water are available at each such unit and are mixed when when necessary to provide water of the desired temperature for the unit while maintaining a uniform rate of water flow through the units. That was a very substantial improvement over the prior four pipe systems. However, the use of neutral water to mix with either hot or cold water gives greatly improved utilization of energy. The neutral water is subjected to no heating or cooling and the only energy consumed is that required to circulate it, and it provides precise control of the air temperature.

The present invention is applicable to systems of the types of the illustrative embodiments which have wide ranges of capabilities. Also, when the system has neutral water lines (FIG. 2), substantial savings in energy will be effected, for example, under low-load conditions, when one or more of the air-treating units is operating to heat the air while one or more of the other air-treating units is operating to cool the air. When that system is operating in that manner, heat-balance controller 72 supplies neutral water to the air-treating unit which require heating whenever the temperature of the neutral water is high enough to handle the heating load. The neutral water supplies the desired amount of heat in the air-treating units which require heat, and those units act as heat-sinks for that heat. That effects a corresponding reduction in the cooling load, thus reducing the energy consumption by the compressors. It also reduces the temperature of the water passing to the fluid cooler, and that reduction in the amount of heat which must be discharged increases the efficiency of the heat transfer of the entire refrigeration system.

The invention provides improved control over the quantities of heat stored in or supplied to or discharged from the system, so as to control and change those as required. The storage tanks receive hot water or cold water (or neutral water in FIG. 2), and that permits wide ranges of modes of operating depending upon the existing and anticipated heating and cooling loads.

The illustrative embodiments of the present invention are of the "Envelope System" type (see U.S. Pat. Nos. 3,670,806 and 3,842,901) in which there are false ceilings in the interior space and the return air carries away the heat from the ceiling lights. The term "hot water" and "cold water" are used herein to mean the streams which have passed along the water-heating circuit and the water-cooling circuits, respectfully. The temperatures of those streams of water varies depending upon conditions of operation.

It is understood that modifications can be made in the illustrative embodiments of the invention and that the various aspects thereof can be used separately or together all within the scope of the claims. Each system must be designed and engineered to meet the particular requirements for the system to provide efficient operation at an acceptable initial cost. To that end, the various concepts of the present invention provide choices in the basic design features so as to provide energy-efficient systems which meet a wide range of different basic requirements.

I claim:

1. In an air conditioning system, the combination of, a plurality of air-treating units, each of which has a cooling coil through which water is circulated at a desired temperature and flows through the coil countercurrent to a stream of air which is delivered to an air-conditioned space, a refrigeration system comprising a plurality of refrigeration units each of which has an evaporator-chiller through which the water flows along a water-flow path to be cooled and a water-cooled condenser with a water-flow path through which the water flows to condense refrigerant and to heat the water flowing therealong, means connecting said water-flow paths of said evaporator-chillers into a water-cooling circuit for cooling the water by stages, means connecting said water-flow paths of said condensers into a water-heating circuit to heat the water by stages, said water-cooling circuits and said water-heating circuits being in counterflow relationship whereby the refrigeration unit having the evaporator-chiller at the beginning of said water-cooling circuit has the condenser which is at the end of said water-heating circuit, a storage tank system which is adapted to receive and store water, a fluid cooler having a flow path for said water in heat-exchange relationship with a heat-transfer fluid, a water circulating system comprising pump means to circulate streams of water through said water-heating and water-cooling circuits and water-supply lines to deliver streams of hot water and cold water to said air-treating units and water-return lines to return the water to said pump means, neutral water distribution lines which deliver neutral water from said pump means to each of said air-treating units without said neutral water passing through either said water-heating circuit or said water-cooling circuit, water storage means, storage lines connecting certain of said lines to said storage tank system to permit the circulation of water to and from said storage tank system, and control means which operates to produce and store cold water during off-peak cooling-load periods and to produce and store hot water during off-peak heating-load operations.

2. An air conditioning system as described in claim 1 where said control means supplies neutral water to any air-treating unit which is required to heat air when other of said air-treating units are required to heat air and the neutral water is at a temperature whereby it satisfies the need for heat.

3. In an air conditioning system, the combination of, refrigeration means which operates to produce a stream of cold water and a stream of hot water, a plurality of air-treating units which are positioned remotely from said refrigeration means and each of which is adapted to treat air passing to a particular air-conditioned space, water supply lines and pump means to direct streams of water through said refrigeration system, water supply lines to supply separate streams of cold water and hot water in the respective of said air treating units, separate water return lines for dominately hot and cold water to return water from said air-treating units to said pumps, means, means providing a stream of heat-exchange fluid which is adapted to act as a heat source or a heat sink, a fluid-to-fluid heat exchanger, means to pass a stream of said heat-exchange fluid through said fluid-to-fluid heat exchanger in heat-exchange relationship with a stream of water, and control means which delivers water to each of said air-treating units from the respective of said supply lines to satisfy the requirement for that air-treating unit to heat or cool the air being treated by it, said control means being operative to deliver a stream of said cold water to said fluid-to-fluid heat-exchanger when it is desirable to extract heat from said stream of heat-exchange fluid, and to supply hot water to said fluid-to-fluid heat-exchanger, when it is desirable to discharge heat to said stream of heat-exchange fluid.

4. A method of air conditioning a plurality of spaces which comprises the steps of, producing three separate continuous streams respectfully of hot water and cold water and neutral water wherein the temperature of said neutral water is between the temperatures of said streams of hot water and cold water, delivering a heat-transfer stream of water to each of a plurality of air-treating units which are remote from each other and each of which cools or heats a stream of air which is delivered to an air-conditioned space, and wherein each of said heat-transfer streams is formed from a stream of said hot water or a stream of said cold water or a stream of said neutral water of a mixture of said neutral water with water from only one of said streams of hot water or cold water, controlling the formation of each of said heat-transfer streams in accordance with the air heating or air cooling required of the said heat-treating unit to which that said heat-transfer stream flows, and supplying neutral water to any of said air-treating units which is required to heat air when the dominant action of the other of said air-treating units is to cool air, and returning separate streams from said units receiving hot water and cold water.

5. The method as described in claim 4, wherein all of said streams are produced by pump means which discharges the water to a common line from which all of said streams flow, and wherein said pump means includes one pump which favors directing water into said stream of hot water and another pump which favors directing water into said stream of cold water, and wherein the volumes of said streams are determined by the respective back pressures to the flow of the respective of said streams of hot water and cold water.

6. The method as described in claim 5 wherein said stream of hot water passes through a heater and is heated when its temperature is below an acceptable value.

7. The method as described in claim 4 wherein one or more of said air treating units receives only return air and directs air to an exterior space and another of said air treating units receive outside air and deliver air to an interior space, and wherein the return water from each of said air treating units is received by the pump which gives a preference for water to flow from it to the said stream flowing to that air treating unit.

8. An air conditioning system for a space, comprising the combination of, refrigeration means having a water-cooling circuit through which water flows to form a stream of cold water and a water-heating circuit through which water flows to form a stream of hot water, a fluid cooler which has a coil, means to pass a stream of said cold water through said coil, means to exhaust air from said space past said coil in heat-exchange relationship with said stream of cold water thereby heat is extracted from said air by said stream of cold water, and means to pass said cold water from said coil to the upstream side of said water-heating circuit, whereby the heat extracted from said exhaust air is delivered to the water forming said stream of hot water.

9. The method of cooling a plurality of air conditioned spaces with a refrigeration system having separate air-treating units which comprises the steps of, producing separate streams of hot water and cold water and a stream of neutral water which is at a temperature between those of the other two streams, passing water through a fluid cooler in heat-exchange relationship with a second fluid, delivering a stream of said hot water or said cold water to said fluid cooler respectively to thereby discharge heat from the system or extract heat from said second fluid, storing a quantity of heated water or cold water during off-peak periods to assist in handling anticipated respective heating loads and cooling loads, utilizing said streams of hot water and cold water or a mixture of one of those with said stream of neutral water or said neutral water alone to handle heating and cooling loads, and circulating water from one of said streams to replace the stored water and thereby recover heat from the stored water when desirable for handling anticipated heating loads or when desirable to provide a temporary heat-sink to handle a cooling load.

10. The method as described in claim 9 wherein neutral water is used to provide heat in one air-treating unit when one of the other air treating units requires cooling.

11. In a method of air conditioning a space, the steps of, operating a central staged refrigeration system to produce a stream of hot water having a temperature in excess of 114° F. and a stream of cold water, passing water from both of said streams to air treating means through which conditioned air is supplied to said space, passing water from said stream of said hot water through a fluid cooler, exhausting a stream of low wet bulb temperature air from said space in heat exchange relationship with said stream of hot water in said fluid cooler, and evaporating water in said stream of air to reduce the temperature of said stream of hot water and produce a reduction of the order of not less than 10° F. in the temperature of said stream of hot water.

12. In a system for air conditioning a space, the combination of, air treating means from which air is passed to said space at the desired temperature, a water-to-fluid heat-exchange unit, pumping means and circulating means to pump a first stream of water along a water-heating condenser circuit and thence through said heat-exchange unit under cooling-load conditions so as to discharge heat to a stream of air, said pumping and circulating means also being operative to pump a second stream of water along a water-cooling path and thence to and through said air treating means to cool air passing to said space, means to pass water from said first stream to said air treating means to heat air passing to said space, means to exhaust air from said space through said heat-exchange unit under cooling-load conditions to provide low wet bulb temperature air to aid the cooling of said first stream of water by said heat exchanger unit, and under heating-load conditions to heat said water from said second stream in said heat exchange unit, said pumping means and circulating means being operative to return the water to said pumping means to provide continuous flow circuits, with a preference for water from each of said first and second streams to be returned to the same stream.

13. The system as described in claim 12 which includes tank means connected to said pumping and circulating means, and means to direct water from either of said first or second streams to and from said tank means.

14. The system as described in either of claims 12 or 13 wherein the fan heat and pump heat which is produced is delivered to said first stream.

15. The system as described in either of claims 12 or 13 wherein said pumping and circulating means produces a common discharge for said streams of hot water and cold water, and which includes means for circulating neutral water from said common discharge to said air treating means.

* * * * *